(12) United States Patent
Ichikawa et al.

(10) Patent No.: US 7,302,872 B2
(45) Date of Patent: Dec. 4, 2007

(54) METHOD OF DETERMINING A SHIFT GATE POSITION FOR A VEHICLE TRANSMISSION AND A SHIFT GATE POSITION DETERMINING SYSTEM FOR THE SAME

(75) Inventors: Yoshihiro Ichikawa, Gifu (JP); Tatuhiro Miyake, Kariya (JP); Takeshige Miyazaki, Anjyo (JP); Mitsutoshi Kamiya, Kariya (JP); Yoshiki Itoh, Okazaki (JP); Hideyuki Yamada, Nagoya (JP)

(73) Assignee: Aisin AI Co., Ltd., Nishio-shi (JP)

( * ) Notice: Subject to any disclaimer, the term of this patent is extended or adjusted under 35 U.S.C. 154(b) by 645 days.

(21) Appl. No.: 10/785,050

(22) Filed: Feb. 25, 2004

(65) Prior Publication Data
US 2004/0250642 A1    Dec. 16, 2004

(30) Foreign Application Priority Data
Feb. 25, 2003    (JP) ........................ 2003-047344

(51) Int. Cl.
*F16H 59/00*    (2006.01)
(52) U.S. Cl. ........................................................ 74/335
(58) Field of Classification Search .................. 701/64; 74/335, 336 R, 473.12, 473.21, 473.25, 473.36, 74/473 XY
See application file for complete search history.

(56) References Cited

U.S. PATENT DOCUMENTS

| | | | |
|---|---|---|---|
| 6,691,588 B2 * | 2/2004 | Miyazaki et al. | 74/336 R |
| 6,865,467 B2 * | 3/2005 | Berger et al. | 701/51 |
| 7,080,568 B2 * | 7/2006 | Itoh et al. | 74/335 |
| 7,137,311 B1 * | 11/2006 | Neubauer et al. | 74/335 |
| 2001/0025535 A1 * | 10/2001 | Kamiya | 74/335 |
| 2002/0029645 A1 * | 3/2002 | Jackson et al. | 74/335 |

FOREIGN PATENT DOCUMENTS

JP    2002-147590 A    5/2002

* cited by examiner

*Primary Examiner*—Roger Pang
(74) *Attorney, Agent, or Firm*—Oblon, Spivak, McClelland, Maier & Neustadt, P.C.

(57) ABSTRACT

At least one shift gate includes a stabilizing range for stabilizing an engagement between the engaging portion and the at least one shift gate. The system stops movement of the movable member by driving the actuator and determines a portion at the movable member as a shift gate reference position at a time when the movement of the movable member stops. The system moves the movable member by driving the actuator, stabilizes the engaging portion in the stabilizing range, and determines the stabilizing position of the engaging portion as a position of the at least one shift gate.

13 Claims, 10 Drawing Sheets

METHOD OF DETERMINING A SHIFT GATE POSITION FOR A VEHICLE TRANSMISSION AND A SHIFT GATE POSITION DETERMINING SYSTEM FOR THE SAME

CROSS REFERENCE TO RELATED APPLICATIONS

This application is based on and claims priority under 35 U.S.C. § 119 with respect to Japanese Patent Application 2003-047344, filed on Feb. 25, 2003, the entire content of which is incorporated herein by reference.

FIELD OF THE INVENTION

This invention generally relates to a method of determining a shift gate position of a vehicle transmission having at least one shift gate defining a vehicle shift stage. More particularly, this invention pertains to a shift gate position determining system for a vehicle transmission.

BACKGROUND

A conventional control device for a transmission is disclosed in Japanese Patent Laid-Open Publication No. 2002-147590. The control device for the transmission includes a shift operation mechanism for performing a shift operation in the transmission, a select actuator for moving the shift operation mechanism in a selecting direction, a shift actuator for moving the shift operation mechanism in a shift direction, a target gear position instruction means for instructing a target gear position of the transmission, and a controller for controlling the select and shift actuators based upon a shift instruction from the target gear position instruction means.

In the above-described control device for the transmission, the select and shift actuators are controlled based upon the shift instruction from the target gear position instruction means. Therefore, the shift operation can be automated even if the vehicle is provided with a manual type transmission.

In order to automate the shift operation in the above-described vehicle transmission, it is necessary to obtain information on each shift gate position. However, the accurate information on the shift gate position cannot be always obtained especially after assembling the transmission in the vehicle. Further, even if a design dimension is referred to, the accurate information on the shift gate position cannot be necessarily obtained due to some defects such as dimensional tolerance for each product. Automation of the shift operation can be preferably achieved when the accurate information on the shift gate position is obtained.

The present invention is based on the observation by the inventors of the invention. In light of forgoing, a need exists for providing an improved method of determining a shift gate position for a vehicle transmission and an improved shift gate position determining system.

SUMMARY OF THE INVENTION

According to an aspect of the present invention, a shift gate position determining system for a vehicle transmission includes a base portion supporting an engaging portion, at least one shift gate to be engaged with and to be disengaged from the engaging portion, the at least one shift gate defining a vehicle shift stage, a movable member being movable to engage the at least one shift gate with the engaging portion and to disengage the at lest one shift gate from the engaging portion, and an actuator for moving the movable member in a direction for engaging the at least one shift gate with the engaging portion and for disengaging the at least one shift gate from the engaging portion. The at least one shift gate includes a stabilizing range for stabilizing an engagement between the engaging portion and the at least one shift gate. The system stops movement of the movable member by driving the actuator and determines a portion at the movable member as a shift gate reference position at a time when the movement of the movable member stops. The system moves the movable member by driving the actuator, stabilizes the engaging portion in the stabilizing range, and determines the stabilizing position of the engaging portion as a position of the at least one shift gate.

BRIEF DESCRIPTION OF THE DRAWING FIGURES

The foregoing and additional features and characteristics of the present invention will become more apparent from the following detailed description considered with reference to the accompanying drawing figures, wherein.

DETAILED DESCRIPTION OF THE PREFERRED EMBODIMENTS

Figure 1:
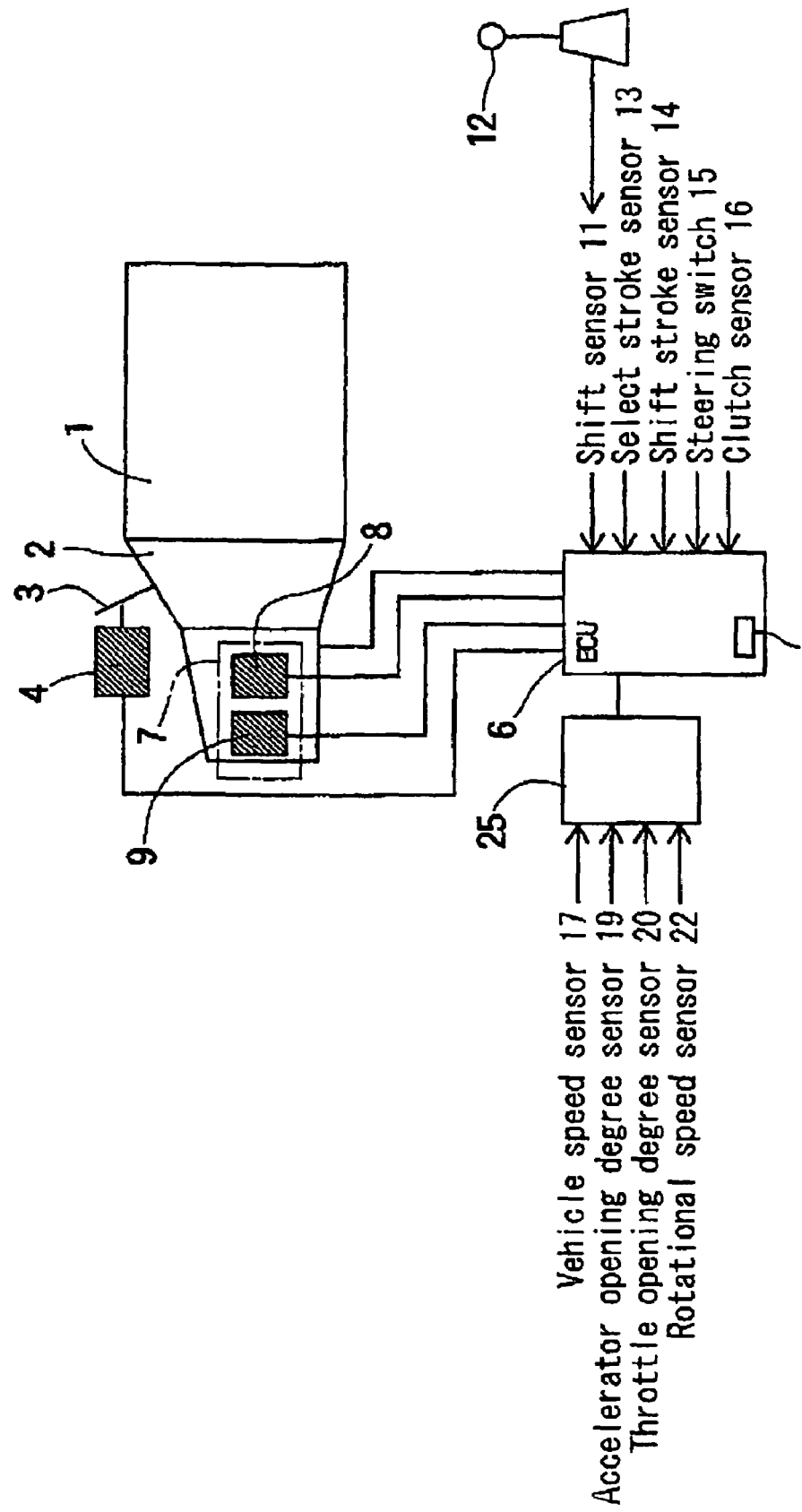
FIG. 1 is a block view schematically illustrating a shift gate position determining system for a transmission according to an embodiment of the present invention.

As illustrated in FIG. 1, a shift gate position determining system for a transmission according to an embodiment of the present invention includes a vehicle driving power source 1, e.g., an internal combustion engine or an electric motor, a vehicle transmission 2, a clutch 3, a clutch actuator 4 for operating the clutch 3, an electronic control unit (hereinafter, referred to as an ECU) 6 having a central processing unit (hereinafter, referred to as a CPU) and a memory 6c, a select actuator 8, and a shift actuator 9. The transmission 2 transmits driving power from the driving power source 1 to a driving axle. The transmission 2 according to the first embodiment can be a known manual transmission in which the shift operation is automatically performed. The clutch 3 is operated by the clutch actuator 4 for establishing or interrupting a power transmitting path from the driving power source 1 to the transmission 2. The select actuator 8 is activated for performing a select operation of an actuator mechanism 7. The shift actuator 9 is activated for performing a shifting operation of the actuator mechanism 7.

The shift gate position determining system for the transmission 2 further includes a shift sensor 11, a select stroke sensor 13, a shift stroke sensor 14, a steering switch 15, a clutch sensor 16, a vehicle speed sensor 17, an accelerator opening degree sensor 19, a throttle opening degree sensor 20, and a rotational speed sensor 22. The shift sensor 11 detects a shift stage instructed by a shift lever 12 manually operated by a user. The select stroke sensor 13 detects a stroke position of the actuator mechanism 7 in a select direction. The shift stroke sensor 14 detects a stroke position of the actuator mechanism 7 in a shift direction. The steering switch 15 is mounted near a driver's seat to be operated upon the shift operation. The clutch sensor 16 detects a position of the clutch 3 or a load of the clutch 3. The vehicle speed sensor 17 detects a physical amount related to a vehicle speed. The accelerator opening degree sensor 19 detects a physical amount related to an accelerator opening degree, i.e., an accelerator opening degree of an accelerating element such as an accelerator pedal operated by the driver. The throttle opening degree sensor 20 detects a throttle opening degree. The rotational speed sensor 22 detects a physical amount related to a rotational speed of a rotational shaft of the vehicle driving power source 1 such as a crankshaft of the internal combustion engine. A clutch pedal to be operated by the user is not necessarily provided, and yet can be provided near the driver's seat.

Each signal outputted from the shift sensor 11, the select stroke sensor 13, the shift stroke sensor 14, the steering switch 15, and the clutch sensor 16 is inputted to the ECU 6. Each signal outputted from the vehicle speed sensor 17, the accelerator opening degree sensor 19, the throttle opening degree sensor 20, and the rotational speed sensor 22 is first inputted to an engine electronic control unit (hereinafter, referred to as an engine ECU) 25, and is then inputted to the ECU 6. The ECU 6 outputs a control signal for controlling each of the select actuator 8, the shift actuator 9, and the clutch actuator 4 based upon the above-described signals. Therefore, the shift gate position determining system for the transmission 2 can be automatically operated. Further, the shift operation can be also automatically performed. The select actuator 8, the shift actuator 9, and the clutch actuator 4 can be an electric type motor, a hydraulic pressure type motor, and an air pressure type motor, as non-limiting examples.

Figure 2:
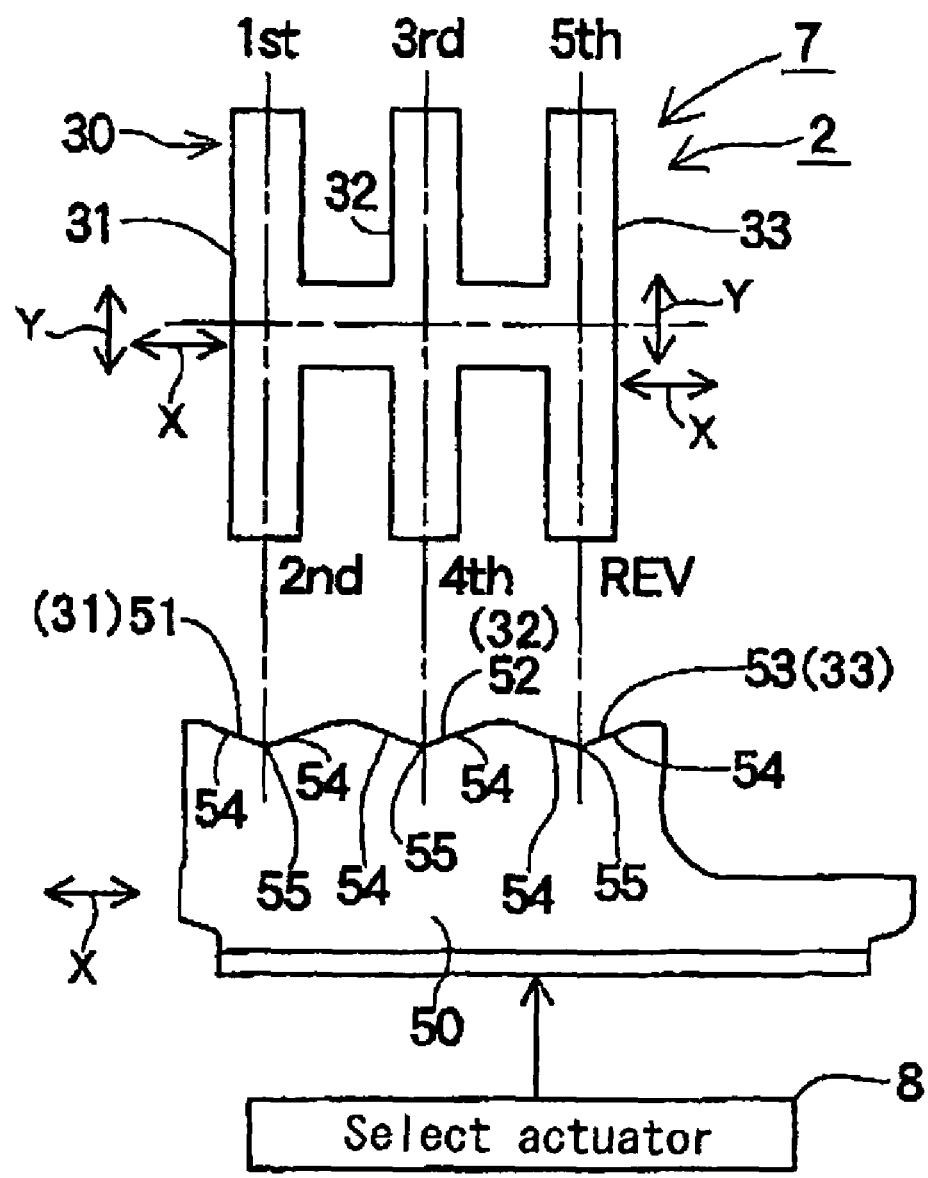
FIG. 2 is a schematic view illustrating a gate mechanism according to the embodiment of the present invention.

FIG. 2 illustrates a gate mechanism 30 related to the actuator mechanism 7. The gate mechanism 30 has plural gates arranged in the select direction. Each gate includes two shift positions for defining vehicle shift stages, respectively. More particularly, as illustrated in FIG. 2, the gate mechanism 30 according to the embodiment of the present invention is a three-gate type. The gate mechanism 30 includes a first shift gate 31, a second shift gate 32, and a third shift gate 33, all of which are arranged in parallel along the select direction. The first shift gate 31 defines a first shift stage and a second shift stage. The second shift gate 32 defines a third shift stage and a fourth shift stage. The third shift gate 33 defines a fifth shift stage and a reverse shift stage. In FIG. 2, the select direction is denoted with an arrow X, and the shift direction is denoted with an arrow Y. According to the embodiment of the present invention, the gate mechanism 30 is the aforementioned tree-gate type. However, the gate mechanism 30 is not limited the above-description and can be a different type.

Figure 3:
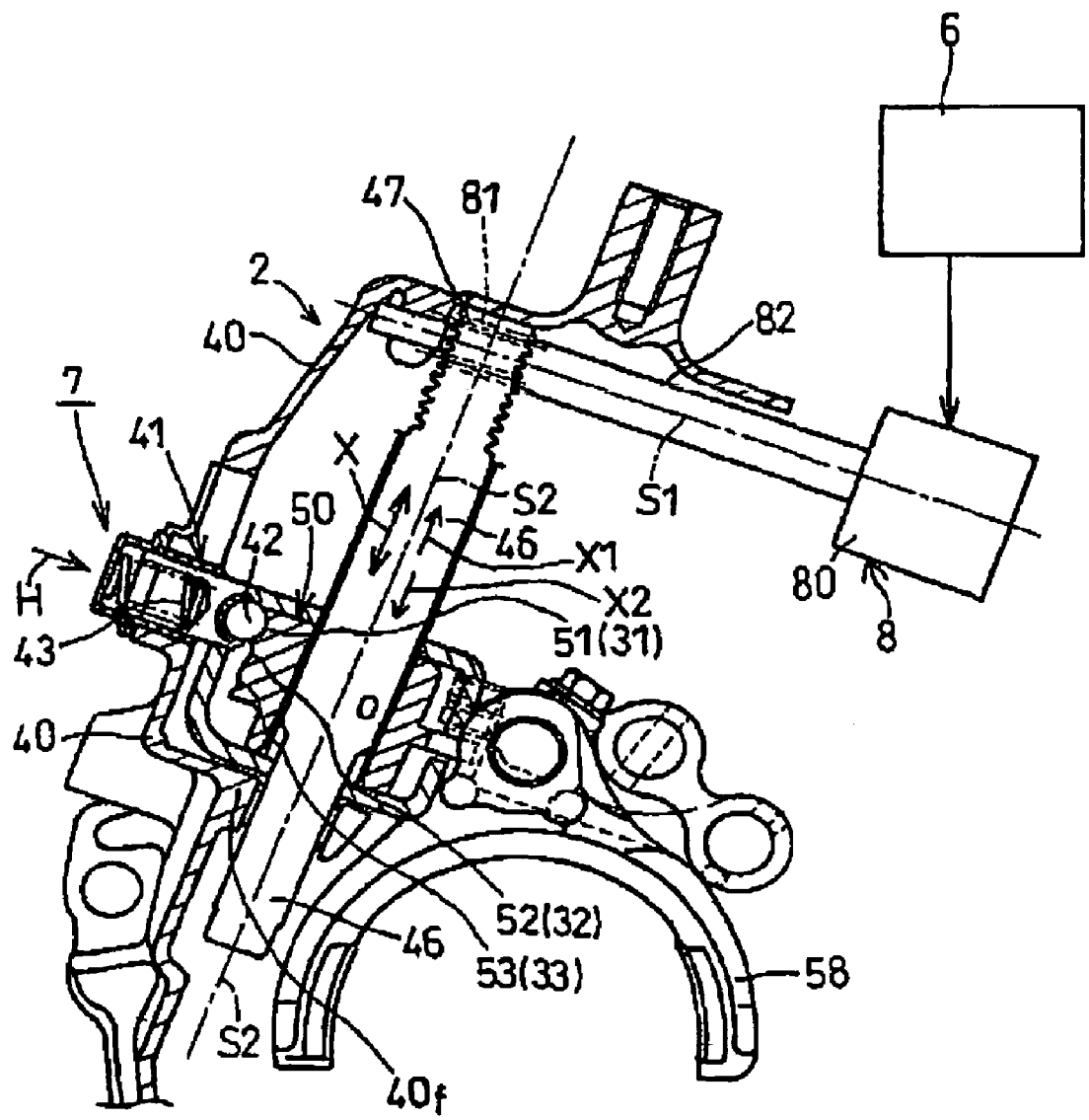
FIG. 3 is a view illustrating an actuator mechanism according to the embodiment of the present invention.

As illustrated in FIG. 3, the actuator mechanism 7 is supported by a housing 40 that is a portion of the transmission 2. The actuator mechanism 7 includes an engagement mechanism 41 supported by the housing 40 (i.e., a base portion), a groove mechanism 50 movable to be engaged with or disengaged from the engagement mechanism 41, a movable member 46 adjusted to support the groove mechanism 50, and the select actuator 8 for moving the movable member 46 in a longitudinal direction thereof, i.e., in the select direction which is denoted with the arrow X. The movable member 46 can be referred to as a shift and select shaft.

As illustrated in FIG. 3, the engagement mechanism 41 includes a lock ball 42 configured as an engaging portion, and a biasing spring 43 (i.e., a biasing element) configured to bias the lock ball 42 in a locking direction denoted with an arrow H. In the meantime, the groove mechanism 50 includes a first groove 51, which is approximately concave-shaped and corresponds to the first shift gate 31, a second groove 52, which is also approximately concave-shaped and corresponds to the second shift gate 32, and a third groove 53, which is also approximately concave-shaped and corresponds to the third shift gate 33. Turning back to FIG. 2, each of the grooves 51, 52, and 53 has an inclined surface 54 having a V shape in a cross section, and a deepest portion 55 that enhances an engaging force with the lock ball 42. The deepest portion 55 is a part of the inclined surface 54.

The inclined surface 54 for each of the grooves 51, 52, and 53 has the V shape in the cross section which can automatically move or orient the lock ball 42 and has a guiding range for guiding the lock ball 42 to the deepest portion 55. When the movable member 46 is not applied with any force from outside while the lock ball 42 has been positioned in the guiding range, the movable member 46 is moved in the arrow X direction so as to automatically orient the lock ball 42 into the deepest portion 55 of the inclined surface 54. Therefore, the guiding range of the inclined surface 54 can function as a stabilizing range for stabilizing the engagement between the engaging portion (i.e., the lock ball 42) and the at least one shift gate (i.e., the shift gates 31, 32, and 33), i.e., a stabilizing range for stabilizing the positioning of the movable member 46. Further, the deepest portion 55 can function as a portion for most stabilizing the positioning of the movable body 46 among the inclined surface 54.

The deepest portion 55 of each of the grooves 51, 52, and 53 corresponds to each shift gate position. That is, the deepest portion 55 of the first groove 51 corresponds to the position of the first shift gate 31, the deepest portion 55 of the second groove 52 corresponds to the position of the second shift gate 32, and the deepest portion 55 of the third groove 53 corresponds to the position of the third shift gate 33.

FIG. 3 further illustrates a shift fork 58. When the actuator mechanism 7 is moved in the shift direction, on the other hand, the movable member 46 is rotated about an axis S2 by the shift actuator 9.

The select actuator 8 includes an electric motor 80 driven by the ECU 6, and a rotational shaft 82 rotated about an axis S1 and having a pinion gear 81. The movable member 46 is provided with a rack portion 47. When the electric motor 80 is driven for rotation, the pinion gear 81 of the rotational shaft 82 is rotated. Therefore, the movable member 46 is moved back and forth in the select direction, i.e., in the direction denoted with the arrow X via the rack portion 47 in response to the rotation of the pinion gear 81. The movable member 46 moves in the select direction denoted with the arrow X relative to the lock ball 42.

Next, the following description will be given for describing determination of the positions of the first, second, and third shift gates 31, 32, and 33. A shift gate reference position determining process according to the embodiment of the present invention is initiated from an initial position illustrated in FIG. 4. In order to perform the shift gate reference position determining process, the movable member 46 is moved in a direction denoted with an arrow X2, i.e., in an impact direction, by activating the electric motor 80 of the select actuator 8 by the ECU 6. A portion 46*m* of the movable member 46 comes in contact with an impact portion 40*f* of the housing 40, wherein the movable member 46 is restrained from moving in the arrow X direction. As described above, a shift gate reference position PA (illustrated in FIG. 5) is determined at a position of the movable member 46 which is in contact with the lock ball 42 while the movable member 46 has been stationary.

Figure 5:
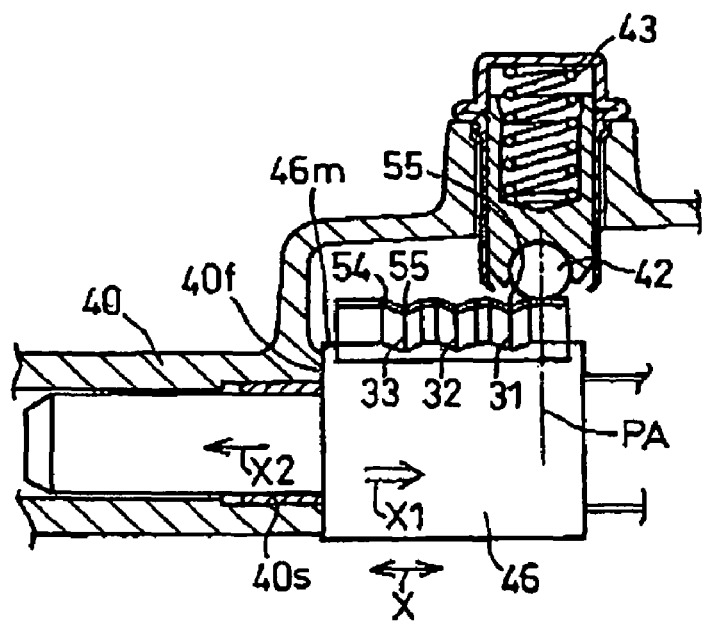
FIG. 5 is a view illustrating a condition in which a shift gate reference position has been determined.
Figure 6:
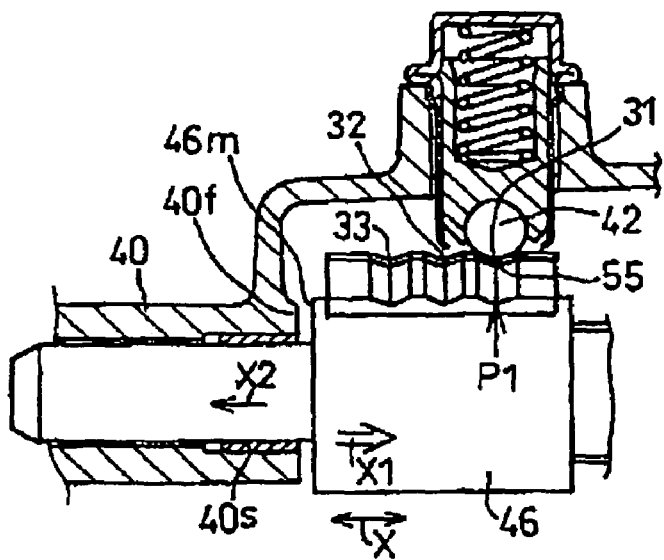
FIG. 6 is a view illustrating a condition in which a first shift gate position has been determined.

As illustrated in FIG. 5, the shift gate reference position PA is determined outside the guiding range of the first shift gate 31 and at a side being way from the second shift gate 32. Further, the housing 40 is provided with a bearing 40*s*, enabling smooth movement of the movable member 46.

Secondarily, the lock ball 42 is intended to position in the guiding range of the first shift gate 31 of the movable member 46. The ECU 6 activates the electric motor 80 of the select actuator 8 so as to move the movable member 46 in the arrow X1 direction (illustrated in FIG. 5). The arrow X1 direction is opposite to the direction in which the movable member 46 is moved to impact with the impact portion 40*f* of the housing 40.

When the lock ball 42 is shifted to the guiding range of the first shift gate 31, the activation of the electric motor 80 is terminated. The movable member 46 is not hence applied with driving force from the electric motor 80 any more. As described above, the first shift gate 31 has the V-shaped cross section and the guiding range, i.e., the stabilizing range. In favor of this structure of the first shift gate 31, even if the electric motor 80 has not been driven, the movable member 46 can be moved so as to automatically shift and orient the lock ball 42 at the deepest portion 55 of the first shift gate 31. Accordingly, the center of the lock ball 42 is automatically stabilized at the deepest portion 55 in the guiding range of the first shift gate 31. In the meantime, the movable member 46 is also stabilized at a time when the lock ball 42 is stabilized at the deepest portion 55. The position at which the lock ball 42 is stabilized is determined as a position P1 of the first shift gate 31 along the moving direction of the movable member 46.

Figure 7:
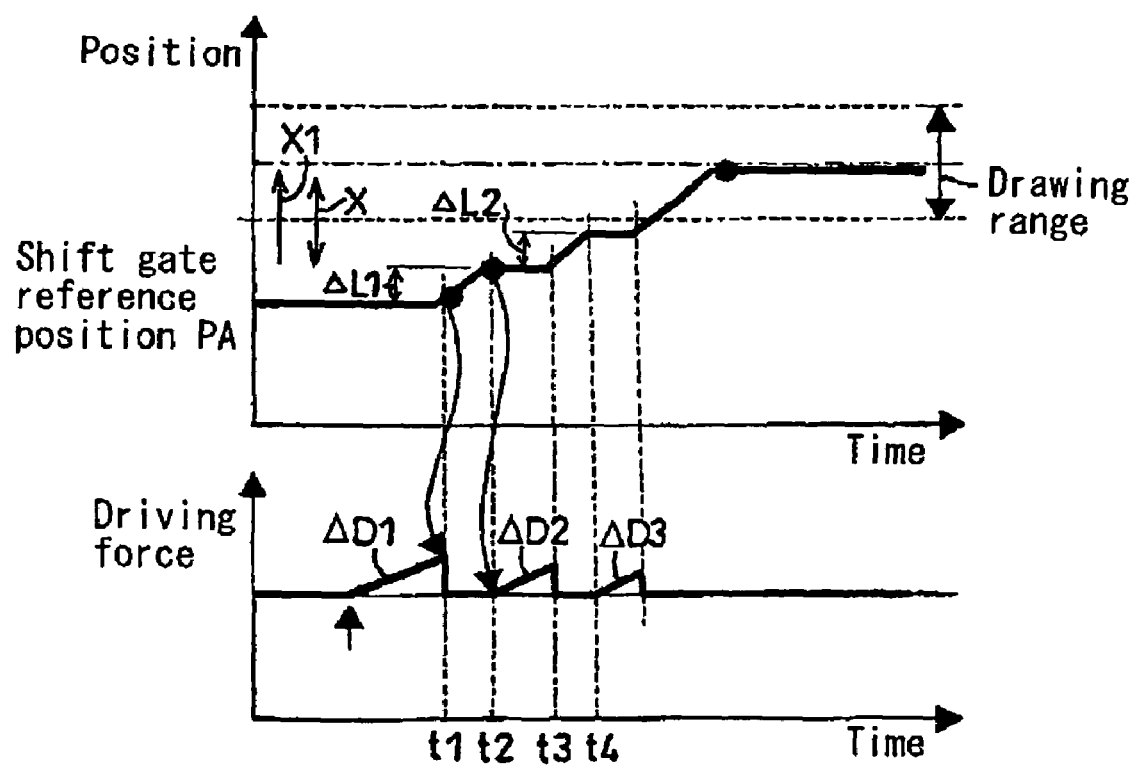
FIG. 7 is a model time chart for explaining a relationship between activation of a select actuator and a moving condition of a movable member during a shift gate position determining process according to the embodiment of the present invention.

FIG. 7 is a time chart for explaining a relationship between a driving force outputted from the select actuator 8 and a moving condition of a movable member 46 during the shift gate position determining process according to the embodiment of the present invention. A horizontal axis of the time chart illustrated in FIG. 7 represents a time, a vertical axis thereof represents driving force from the electric motor 80 of the select actuator 8 and a position of the movable member 46. As illustrated in FIG. 7, when the movable member 46 is positioned at the shift gate reference position PA, i.e., when the engagement portion between the lock ball 42 and the groove mechanism 50 (i.e., the movable member 46) is positioned at the shift gate reference position PA, the electric motor 80 of the select actuator 8 outputs a driving force ΔD1 so as to move the movable member 46 in the arrow X1 direction. In this case, the movable member 46 is designed to move with a moving amount ΔL1. The ECU 6 detects the movement of the movable member 46 at a time t1, wherein the driving force outputted from the electric motor 80 is cancelled to be zero. The movable member 46 has an inertia force. Therefore, even when the electric motor 80 does not output the driving force, the movable member 46 still moves to a certain degree with the inertia force. The ECU 6 then detects termination of the movement of the movable member 46 at a time t2, wherein the electric motor 80 outputs a driving force ΔD2. In this case, the movable member 46 moves in the arrow X1 direction with a moving amount ΔL2. The ECU 6 further detects the movement of the movable member 46 at a time t3, wherein the driving force outputted from the electric motor 80 is cancelled to be zero. In this case, the movable member 46 still moves to a certain degree with the inertia force. The ECU 6 still further detects termination of the movement of the movable member 46 at a time t4, wherein the electric motor 80 outputs a driving force ΔD3. In this case, the movable member 46 can be moved slightly along the arrow X1 direction.

As described above, according to the embodiment of the present invention, the movable member 46 is intermittently moved with slight moving amount every time by intermittently driving the electric motor 80. The electric motor 80 is intermittently activated until the lock ball 42 reaches the guiding range of the first shift gate 31. When the lock ball 42 has been moved to the guiding range of the first shift gate 31, the movable member 46 is moved in order to automatically guide the lock ball 42 to the deepest portion 55. Therefore, at this point, the activation of the electric motor 80 is terminated. Once the lock ball 42 is oriented at the deepest portion 55 in the guiding range of the first shift gate 31, the movable member 46 is stopped from moving and can be stabilized.

As described above, a position P2 of the second shift gate 32 is then determined after determining the position P1 of the first shift gate 31. The lock ball 42 is intended to position in the guiding range of the second shift gate 32 of the movable member 46. The ECU 6 activates the electric motor 80 of the select actuator 8 so as to move the movable member 46 in the arrow X1 direction. That is, in the same manner as explained in FIG. 7, the electric actuator 80 intermittently outputs the driving force such that the movable member 46 is intermittently moved along the arrow X1 direction.

When the lock ball 42 has been shifted to the guiding range of the second shift gate 32, the activation of the electric motor 80 is terminated. Even if the electric motor 80 has not been driven any more, the lock ball 42 can be automatically shifted to the deepest portion 55 of the first shift gate 31. Accordingly, the lock ball 42 can be automatically stabilized at the deepest portion 55 in the guiding range of the second shift gate 32. In the meantime, the movable member 46 is stabilized at a position when the lock ball 42 is stabilized at the deepest portion 55 (the position, at which the movable member 46 is stabilized, is a position where the movable member 46 is located just when the lock ball 42 is stabilized at the deepest portion 55). The position at which the movable member 46 is stabilized is determined as a position P2 of the second shift gate 32 along the axial direction of the movable member 46.

A position P3 of the third shift gate 33 is then determined after determining the position P2 of the second shift gate 32. The lock ball 42 is intended to position in the guiding range of the third shift gate 33 of the movable member 46. The ECU 6 activates the electric motor 80 of the select actuator 8 so as to move the movable member 46 in the arrow X1 direction. That is, in the same manner as explained in FIG. 7, the electric actuator 80 intermittently outputs driving force such that the movable member 46 is intermittently moved along the arrow X1 direction.

When the lock ball 42 has been shifted to the guiding range of the third shift gate 33, the activation of the electric motor 80 is terminated. Even if the electric motor 80 has not been driven any more, the lock ball 42 is automatically shifted to the deepest portion 55 of the third shift gate 33. Accordingly, the lock ball 42 can be automatically stabilized at the deepest portion 55 in the guiding range of the third shift gate 33. In the meantime, the movable member 46 can be stabilized at a position when the lock ball 42 is stabilized at the deepest portion 55. The position at which the movable member 46 is stabilized is determined as a position P3 of the third shift gate 33 along the axial direction of the movable member 46.

According to the embodiment of the present invention, the position P2 of the second shift gate 32 and the position P3 of the third shift gate 33 are determined in the same manner as the position P1 of the first shift gate 31, respectively. However, the present invention is not limited only to the above description, and the positions P2 and P3 can be determined in a different manner from the above description.

Figure 8:
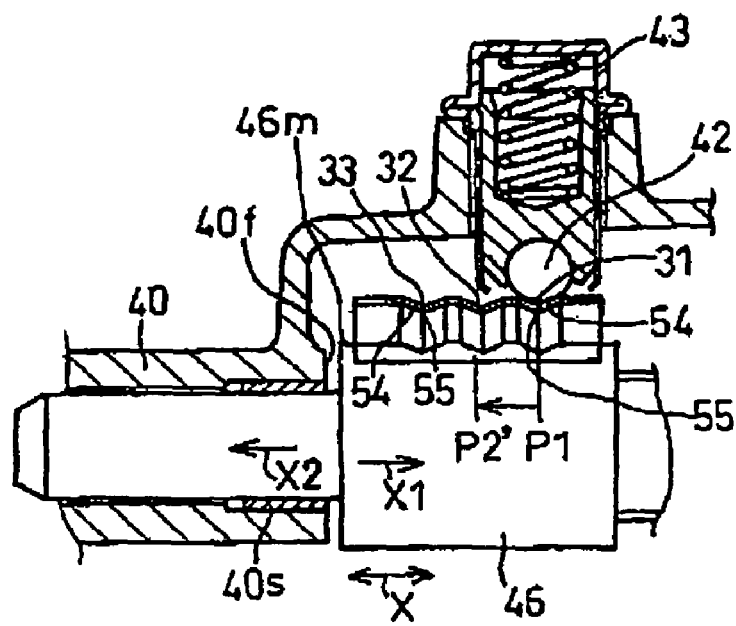
FIG. 8 is a view illustrating a distance between the first shift gate position and a target shift gate position according to the embodiment of the present invention.

The position P2 of the second shift gate 32 can be determined in a following method being different from the above description. As illustrated in FIG. 8, a temporary position P2' of the second shift gate 32 is calculated based upon a design dimensional value with reference to the position P1 of the first shift gate 31. The temporary position P2' can be referred to as a target position. The electric motor 80 of the select actuator 8 is activated via a feedback control and so on in order to position the lock ball 42 at the target position. In this case, the movable member 46 is intermittently moved with a slight moving amount in the arrow X1 direction. If the lock ball 42 has not been positioned in the guiding range of the second shift gate 32 yet, the ECU 6 again activates the electric motor 80 of the select actuator 8 in order to position the lock ball 42 at the target position. When the lock ball 42 reaches the target position, the movement of the movable member 46 is terminated. The above-described operation is intermittently repeated until the lock ball 42 reaches the guiding range of the second shift gate 32.

Figure 9:
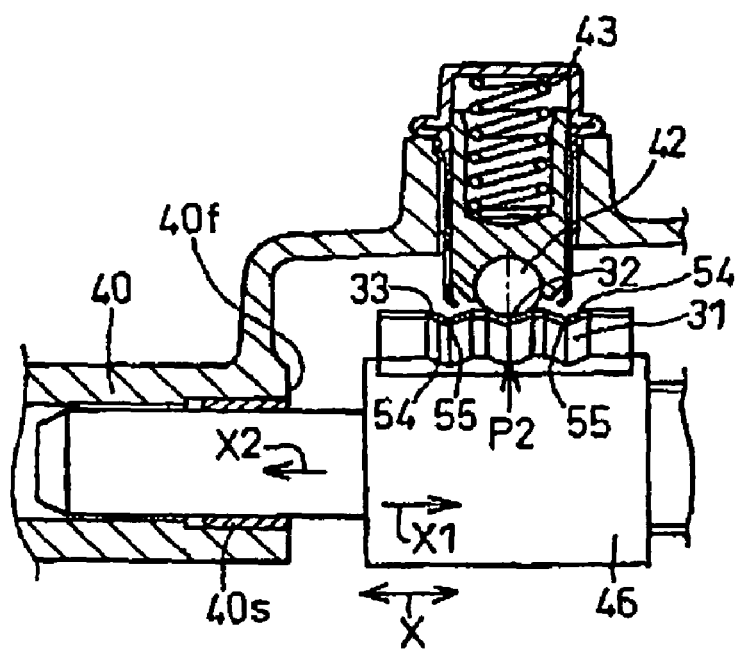
FIG. 9 is a view illustrating a condition in which a second shift gate position has been determined.

When the lock ball 42 is positioned in the guiding range of the second shift gate 32, the actuation of the electric motor 80 is terminated. In this case, the lock ball 42 is automatically oriented at the deepest portion 55 in the guiding range of the second shift gate 32. The movable member 46 is automatically stabilized at a time when the lock ball 42 is oriented at the deepest portion 55, as illustrated in FIG. 9. That is, the movable member 46 is hence stabilized while being stationary. This stabilized position of the movable member 46 is determined as the position P2 of the second shift gate 32.

A temporary position P3' of the third shift gate 33 is calculated based upon a design dimensional value after determining the temporary position P2' of the second shift gate 32. The temporary position P3' is referred to as a target value. If the lock ball 42 has not been positioned in the guiding range of the third shift gate 33 yet, the ECU 6 activates the electric motor 80 of the select actuator 8 in order to position the lock ball 42 at the target position. When the lock ball 42 reaches the target position, the movement of the movable member 46 is terminated. The above-described operation is intermittently repeated until the lock ball 42 reaches the guiding range of the third shift gate 33.

When the lock ball 42 reaches to the guiding range of third shift gate 33, the activation of the electric motor 80 is terminated. In this case, the lock ball 42 is automatically oriented at the deepest portion 55 in the guiding range of the third shift gate 33. The movable member 46 is hence automatically stabilized at a time when the lock ball 42 is oriented at the deepest portion 55, as illustrated in FIG. 9. That is, the movable member 46 is stabilized while being stationary. This stabilized position of the movable member 46 is determined as the position P3 of the third shift gate 33.

Generally speaking, when the transmission 2 is assembled to the vehicle, there may be a case that the position of the movable body 46 at the first shift gate 31, at the second shift gate 32, and at the third shift gate 33 can not be determined with high accuracy. However, as described above according to the embodiment of the present invention, the position of the movable body 46 at the respective first, second, and third shift gates 31, 32, and 33 can be determined with high accuracy. Therefore, the shift operation in the transmission 2 can be effectively automated by referring to the positions P1, P2, and P3. According to the embodiment of the present invention, the position determining process is performed when the vehicle transmission is assembled. Alternatively, the position determining process can be performed in other cases, such as when the transmission added with new components or replacements is again assembled to the vehicle.

Figure 10:
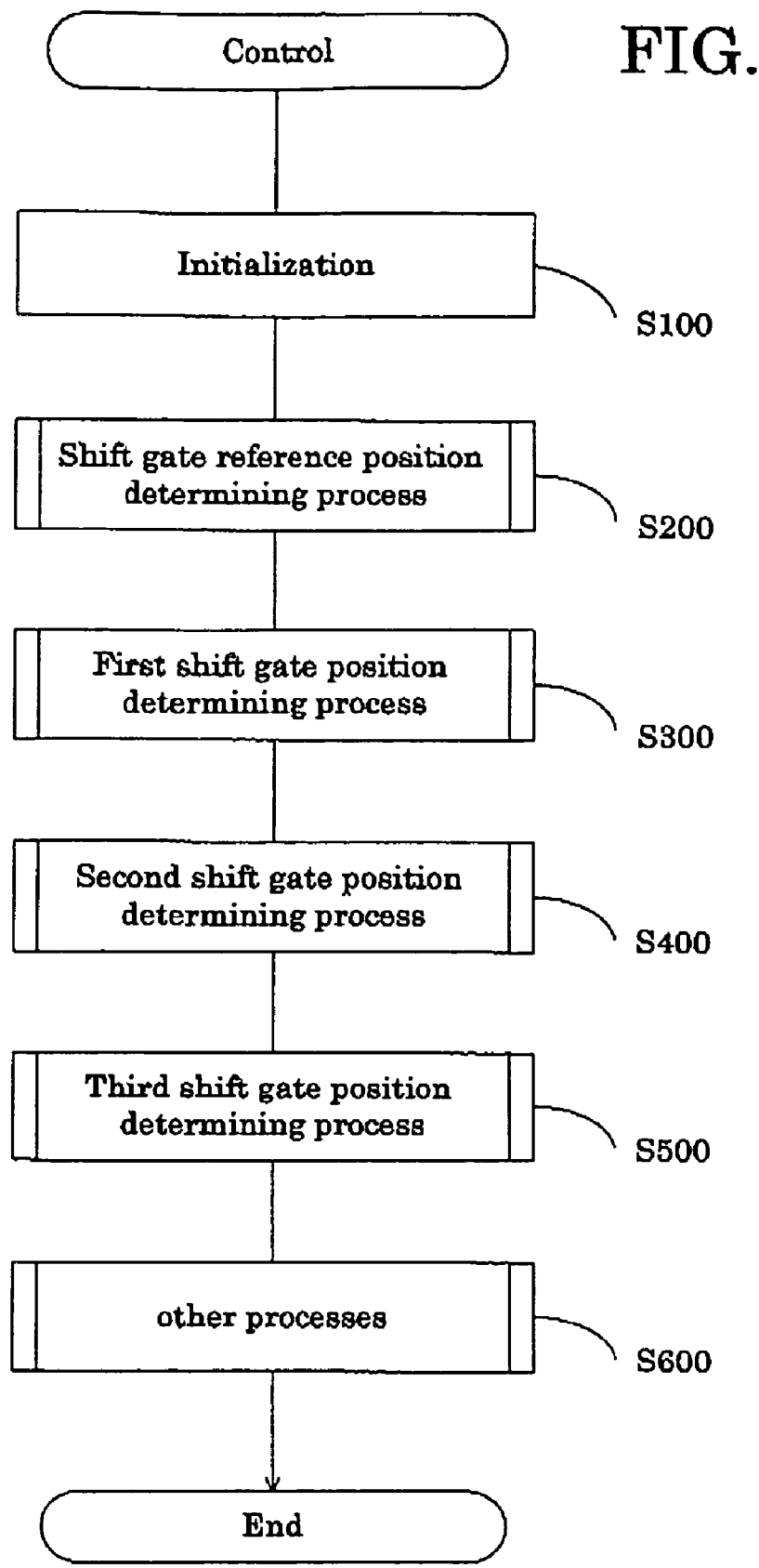
FIG. 10 is a flowchart for explaining a main routine for performing the shift gate position determining processes according to the embodiment of the present invention.

Next, the following description will be given for explaining the position determining process according to the embodiment of the present invention with reference to FIGS. 10 through 13. However, the present invention is not limited to the flowcharts, and yet can be applied to other flowcharts. As illustrated in FIG. 10, the main routine is started with step S100 for initialization. At step S200, the shift gate reference position determining process is performed. At step S300, the shift gate position determining process is performed for determining the position P1 at the first shift gate 31. At step S400, the shift gate position determining process is performed for determining the position P2 at the second shift gate 32. At step S500, the shift gate position determining process is performed for determining the position P3 at the third shift gate 33. At step S600, some other processes are performed.

The shift gate position is determined at each shift gate 31, 32, and 33 in sequence from the shift gate that is closer to the shift gate reference position PA. Step S200 acts as means for determining the shift gate reference position. Step S300 acts as means for determining the shift gate position P1 at the first shift gate 31. Step S400 acts as means for determining the shift gate position P2 at the second shift gate 32. Step S500 acts as means for determining the shift gate position P3 at the third shift gate 33.

Figure 4:
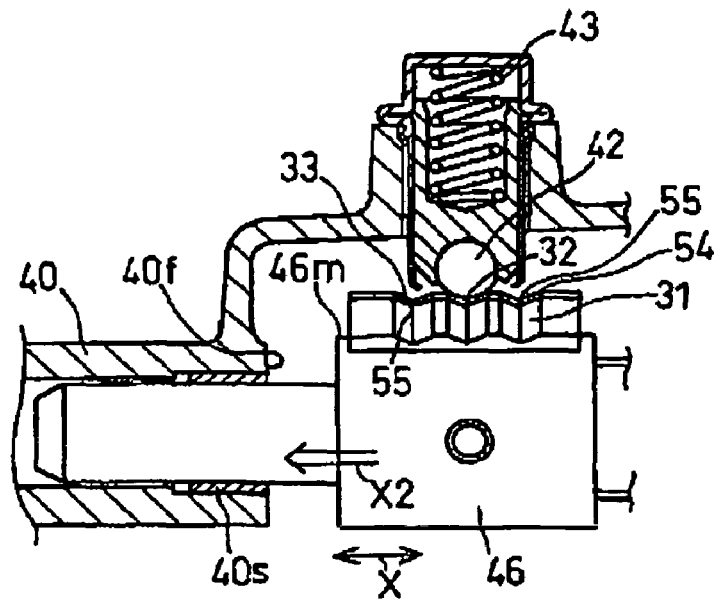
FIG. 4 is a view illustrating a shift gate position immediately after assembling a transmission according to the embodiment of the present invention.
Figure 11:
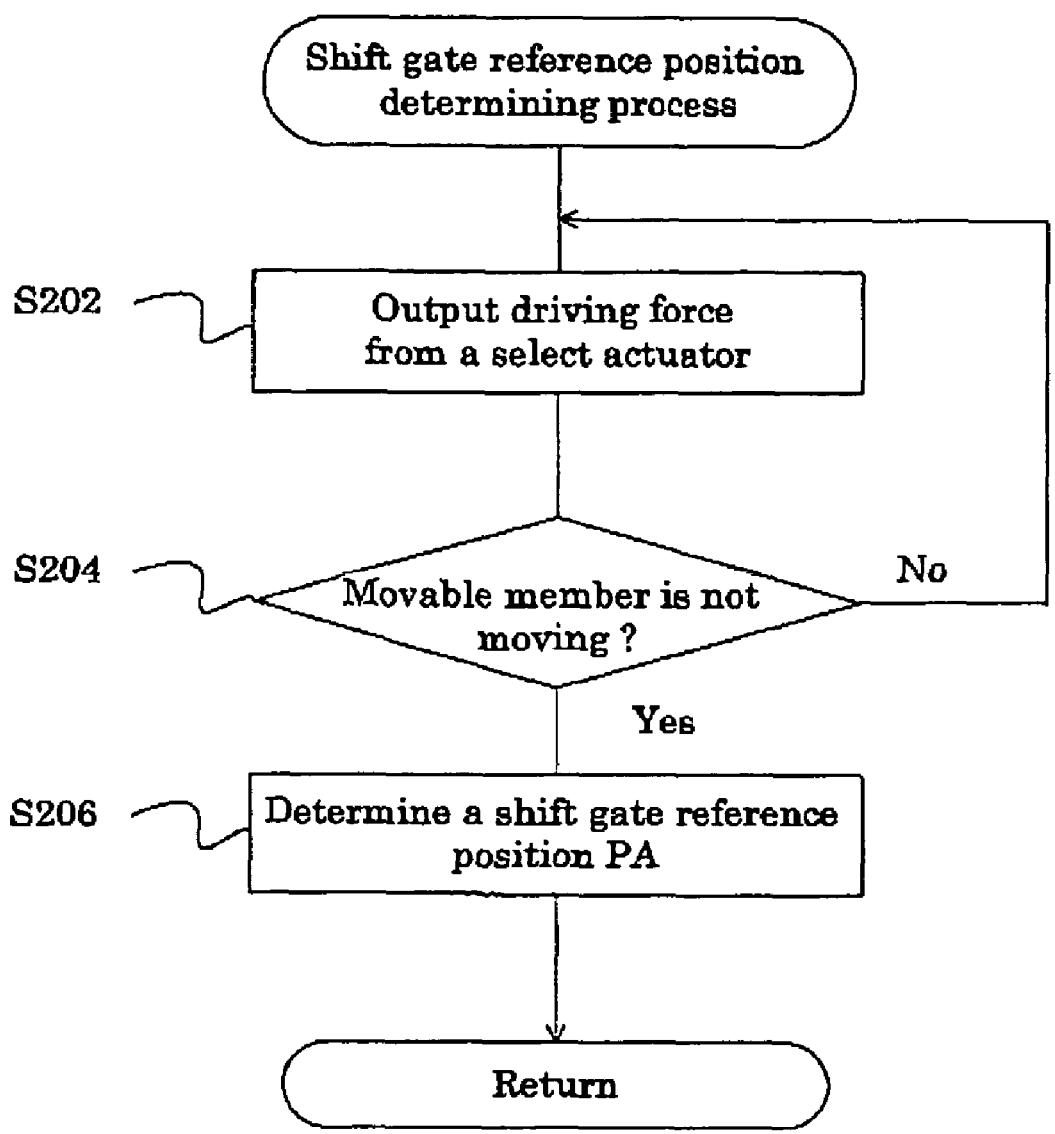
FIG. 11 is a flowchart for explaining a subroutine for determining the shift gate reference position according to the embodiment of the present invention.

As illustrated in FIG. 11, the subroutine of step S200 is started at step S202 in which the driving force is outputted from the electric motor 80 of the select actuator 8 while the movable member 46 is positioned at the initial position as illustrated in FIG. 4. The driving force is outputted from the electric motor 80 in response to electric power applied to the electric motor 80 by the ECU 6. The movable body 46 is moved along the arrow X2 direction from the initial position such that the movable body 46 impacts with the impacting portion 40f. At step S204, the ECU 6 judges whether the movable member 46 is under a stationary condition, i.e. judges whether the movement of the movable member 46 has been terminated. When a negative answer "No" is obtained at step S204, the program returns to step S202. In this case, the driving force is continuously outputted from the electric motor 80 so as to impact the movable member 46 with the moving portion 40f. Further, the driving force outputted from the electric motor 80 can be gradually increased as time goes on.

On the other hand, when an affirmative answer "Yes" is obtained at step S204, the movable member 46 can be assumed to have been in contact with the impacting portion 40f of the housing 40. The program then proceeds to step S206 so as to determine the current position of the stationary movable body 46 as the shift gate reference position PA. The determined shift gate reference position PA is stored in a predetermined memory area of the memory 6c.

Figure 12:
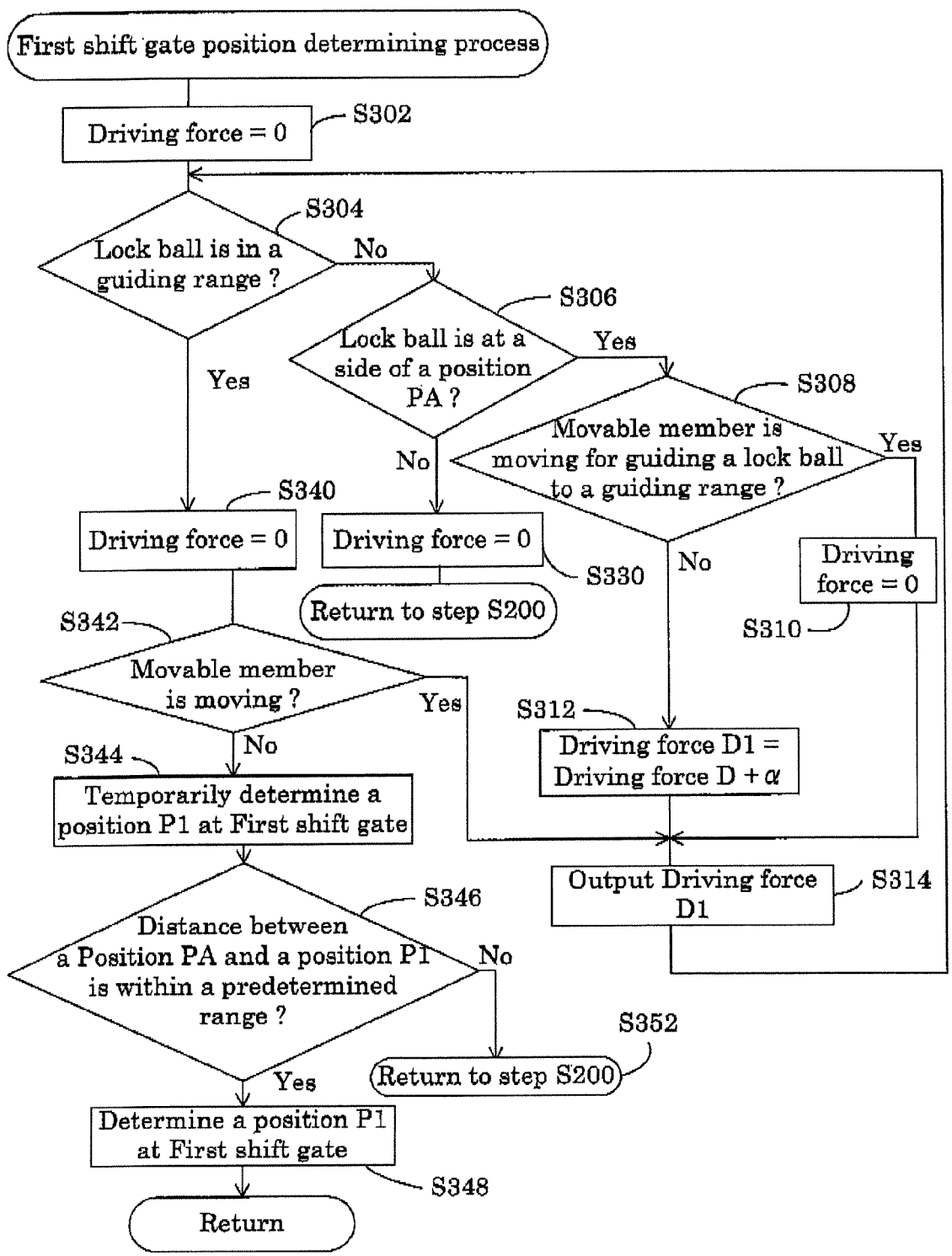
FIG. 12 is a flowchart for explaining a subroutine for determining the first shift gate according to the embodiment of the present invention.

As illustrated in FIG. 12, the shift gate position determining process (step S300) for determining the position P1 at the first shift gate 31 is started at step S302, in which the driving force outputted from the electric motor 80 is cancelled to be zero. At step S304, the ECU 6 judges whether the lock ball 42 has been in the guiding range of the first shift gate 31 of the movable member 46. When a negative answer "No" is obtained at step S304, the program proceeds to step S306, in which the ECU 6 judges whether the lock ball 42 has been at a side of the shift gate reference position PA relative to the first shift gate 31. This judgment is performed based upon a signal outputted from the select stroke sensor 13. When an affirmative answer "Yes" is obtained at step S306, the program proceeds to step S308, in which the ECU 6 judges whether the movable member 46 is still moving in order to guide the lock ball 42 into the guiding range of the first shift gate 31. This judgment is also performed based upon the signal outputted from the select stroke sensor 13.

When an affirmative answer "Yes" is obtained at step S308, the electric motor 80 does not have to be activated any more because the movable member 46 has moved in order to automatically guide the lock ball 42 into the guiding range of the first shift gate 31. Therefore, the program proceeds to step S310, in which the driving force D being outputted from the electric motor 80 at this time is cancelled to be zero. At step S314, the driving force D (D=0) at this time is outputted to the electric motor 80 of the select actuator 8. The program then returns to step S304.

As described above, according to the embodiment of the present invention, the electric motor 80 is not activated while the movable member 46 has moved in order to automatically guide the lock ball 42 towards the deepest portion 55 of the first shift gate 31. Therefore, the lock ball 42 can be effectively prevented from crossing over the guiding range of the first shift gate 31. In this case, steps S308 and S310 act as means for preventing the engaging portion from crossing over the stabilizing range.

On the other hand, when a negative answer "No" is obtained at step S308, the program proceeds to step S312 so as to positively actuate the electric motor 80. More particularly, at step S312, a driving force to be outputted from the electric motor 80 at this time is calculated as follow:

Driving force $D1 = D$ (a previous driving force) $+ \alpha$.

The amount of the current driving force D1 is calculated to meet the condition that the movable member 46 is moved in order to automatically guide the lock ball 42 towards the guiding range of the first shift gate 31. At step S314, the electric motor 80 is driven to output the current driving force D1 in order to guide the lock ball 42 towards the guiding range of the first shift gate 31.

As described above, when the movable member 46 has not moved in order to position the lock ball 42 in the guiding range of the first shift gate 31, the driving force outputted from the electric motor 80 is gradually increased through steps S308, S312, and S314. Therefore, the lock ball 42 can be reliably guided to the guiding range of the first shift gate 31. in this case, steps S308, S312, and S314 act as means for guiding the engaging portion to the first shift gate 31.

Returning back to step S306, when a negative answer "No" is obtained at step S306, there is a possibility that the lock ball 42 may have crossed over the guiding range of the first shift gate 31. Therefore, in order to shift the lock ball 42 to the first shift gate 31, the driving force outputted from the electric motor 80 is cancelled to be zero, and the movable member 46 is returned to the initial position illustrated in FIG. 4. The program then returns to step S200 of the main routine so as to resume the shift gate reference position determining process.

When an affirmative answer "Yes" is obtained at step S304, the lock ball 42 is automatically oriented at the deepest portion 55 of the first shift gate 31, wherein the movable body 46 automatically stops. Therefore, in this case, the electric motor 80 is not required to be activated by the ECU 6. The program hence proceeds to step S340 so as to cancel the current driving force outputted from the electric motor 80 to be zero. At step S342, the ECU 6 judges whether the movable member 46 has moved. When an affirmative answer "Yes" is obtained at step S342, the program proceeds to step S314 so as to output the current driving force zero from the actuator 80 of the select actuator 8.

As described above, when the lock ball 42 is in the guiding range of the first shift gate 31, steps S304 and S340 acts as means for stopping the movable body, wherein the movable member 46 is automatically stopped at a time when the lock ball 42 is in the guiding range of the first shift gate 31. Therefore, the lock ball 42 can be prevented from crossing over the guiding range of the first shift gate 31.

When a negative answer "No" is obtained at step S342, the lock ball 42 has been already oriented at the deepest portion 55 in the guiding range of the first shift gate 31. Therefore, the current position of the movable member 46 is temporarily determined as the position P1 of the first shift gate 31. At step 346, the ECU 6 judges whether a distance between the shift gate reference position PA and the position P1 at the first shift gate 31 is within a design range. When an affirmative answer "Yes" is obtained at step S346, the temporarily determined position P1 is normal. The program then proceeds to step S348 so as to determine the position P1 of the first shift gate 31. The position P1 is then stored at a predetermined area of the memory 6c.

On the other hand, when a negative answer "No" is obtained at step S346, the program proceeds from step S346 to step S352. At step 352, the movable member 46 is returned to the initial position. The program further returns to step S200 of the main routine so as to resume the shift gate reference position determining process.

As described above, steps S342 and S344 act as means for temporarily determining the position P1 of the first shift gate 31. Steps S346 and 348 act as means for determining the position P1 of the first shift gate 31 when the distance between the shift gate reference position PA and the first shift gate 31 is within the design range.

After determining the position P1 of the first shift gate 31, which is nearest to the shift gate reference position PA, the position P2 of the second shift gate 32 is determined. The position P2 of the second shift gate 32 is close to the shift gate reference position PA following the position P1 of the first shift gate 31. As described above, step 400 of the main routine is performed. After determining the position P2 of the second shift gate 32, the position P3 of the third shift gate 33 is determined. The position P3 of the third shift gate 33 is close to the shift gate reference position PA following the position P2 of the second shift gate 32. As described above, step S500 of the main routine is performed.

According to the embodiment of the present invention, the position P2 of the second shift gate 32 and the position P3 of the third shift gate 33 can be determined in the same manner as the flowchart illustrated in FIG. 12, respectively. Alternatively, the respective positions P2 and P3 can be determined by a flowchart illustrated in FIG. 13.

Figure 13:
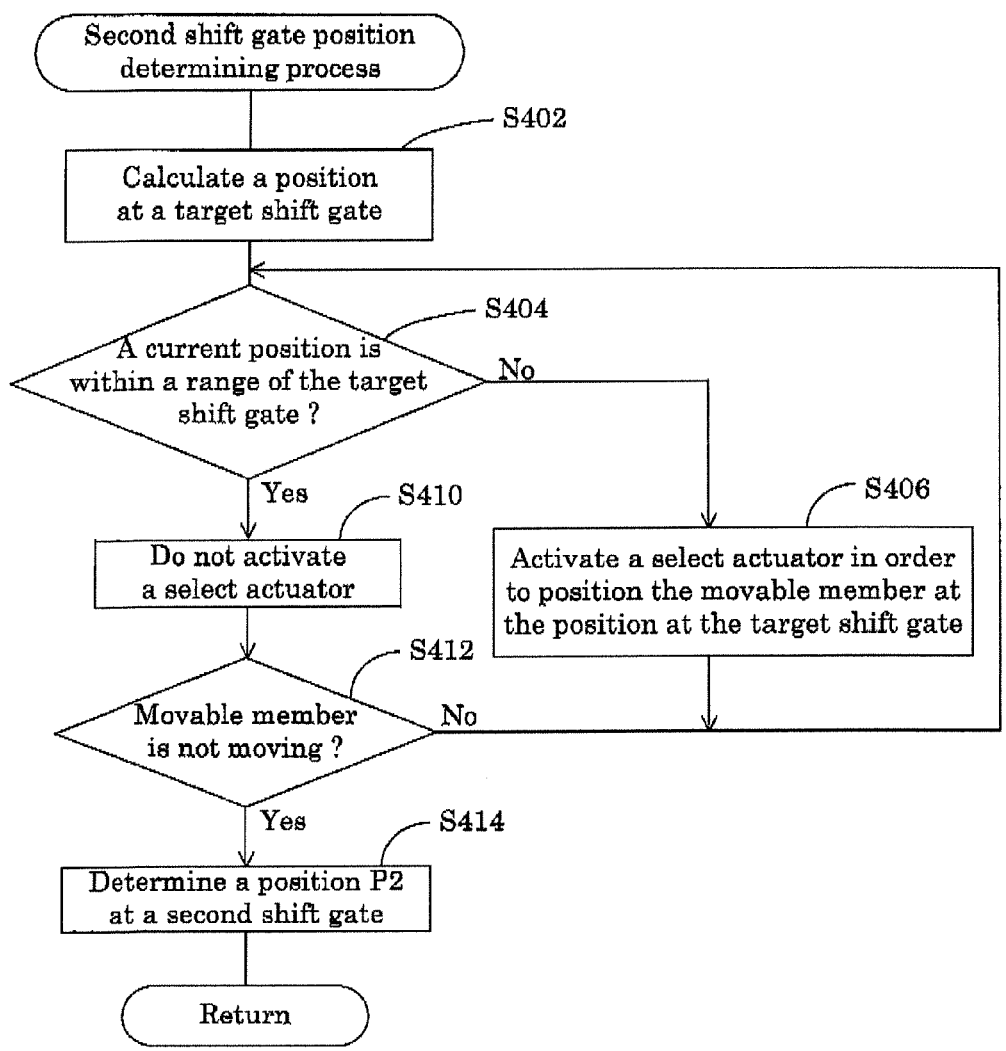
FIG. 13 is a flowchart for determining the second shift gate position by the other control method according to the embodiment of the present invention.

Next, the following explanation will be given for explaining the flowchart illustrated in FIG. 13. At step S402, a position of a target shift gate is temporarily calculated based upon a design dimensional value with reference to the position P1 of the first shift gate 31 determined as described above. In this case, the position of the target shift gate is represented by the temporary position P2' of the second shift gate 32. The movable member 46 is a single assembly. Therefore, the dimensional value for each shift gate is generally accurate. At step S404, the ECU 6 judges whether the current position of the movable member 46 is within a range of the target shift gate. When a negative answer "No" is obtained at step S404, the program proceeds to step S406, in which the electric motor 80 is activated so as to move the movable member 46 in the arrow X1 direction by a feedback control and so on. Therefore, the lock ball 42 can be guided towards the temporarily calculated target shift gate position. The electric motor 80 is activated until the current position of the lock ball 42 corresponds to the range of the target shift gate.

On the other hand, when an affirmative answer "Yes" is obtained at step S404, the program proceeds to step S410, in which the activation of the electric motor 80 is terminated. The movement of the movable member 46 is hence terminated as well. At step S412, the ECU 6 judges whether the movable member 46 has been stationary. When an affirmative answer "Yes" is obtained at step S412, the lock ball 42 has been oriented at the deepest portion 55 of the target shift gate. In other words, the movable member 46 has been stabilized. Therefore, the program proceeds to step 414 in which the target shift gate position is determined as the position P2 of the second shift gate 32. The position P2 is stored in a predetermined area of the memory 6c. The position P3 of the third shift gate 33 can be determined in the above manner as well.

Generally speaking, when the transmission 2 is assembled or reassembled to the vehicle, there may be a case that the position of the movable body 46 at the first shift gate 31, at the second shift gate 32, and at the third shift gate 33 can not be determined with high accuracy. However, as described above according to the embodiment of the present invention, the position of the movable body 46 at the respective first, second, and third shift gates 31, 32, and 33 can be determined with high accuracy. Therefore, the shift operation in the transmission 2 can be effectively automated by referring to the positions P1, P2, and P3.

According to the embodiment of the present invention, the gate mechanism 30 is a three-gate type. However, the gate mechanism 30 can be a four-gate type or a five-gate type as a non-limiting example.

According to the embodiment of the present invention, the shift gate position determining system determines the position P1 at the first shift gate 31, the position P2 at the second shift gate 32, and the position P3 at the third shift gate 33 in sequence. However, the shift gate position determining system can determine each position in other sequence.

According to the embodiment of the present invention, the groove mechanism 50 is movable relative to the engaging mechanism 41 in response to the movement of the movable member 46. Alternatively, the engaging mechanism 41 or the lock ball 42 can be movable relative to the groove mechanism 50 in response to the movement of the movable member 46.

The principles, embodiment and modes of operation of the present invention have been described in the foregoing specification and drawings. However, the invention which is intended to be protected is not to be construed as limited to the particular embodiments disclosed. Further, the embodiment described herein are to be regarded as illustrative rather than restrictive. Plural objectives are achieved by the present invention, and yet there is usefulness in the present invention as far as one of the objectives are achieved. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A shift gate position determining system for a vehicle transmission comprising:
   a base portion supporting an engaging portion;
   at least one shift gate to be engaged with and to be disengaged from the engaging portion, the at least one shift gate defining a vehicle shift stage;
   a movable member being movable to engage the at least one shift gate with the engaging portion and to disengage the at least one shift gate from the engaging portion;
   an actuator for moving the movable member in a direction for engaging the at least one shift gate with the engaging portion and for disengaging the at least one shift gate from the engaging portion; and
   the at least one shift gate including:
      a stabilizing range for stabilizing an engagement between the engaging portion and the at least one shift gate,
      wherein the system moves the movable member by intermittently driving the actuator and discontinues driving the actuator immediately before the engaging portion reaches the stabilizing range, so that the engaging portion is stabilized in the stabilizing range and a stabilizing position of the engaging portion is determined as a position of the at least one shift gate.

2. A shift gate position determining system for a vehicle transmission according to claim 1, wherein the activation of the actuator stops when the movable member is moved, and the activation of the actuator starts when the movement of the movable member is stopped.

3. A shift gate position determining system for a vehicle transmission according to claim 2, wherein the stabilizing range has a groove, and the engaging portion is engaged with and disengaged from the groove in response to the movement of the movable member.

4. A shift gate position determining system for a vehicle transmission according to claim 3, wherein the groove has a V-shaped cross section.

5. A shift gate position determining system for a vehicle transmission according to claim 4, wherein the shift gate reference position is determined by impacting the movable member with the base portion.

6. A method of determining a shift gate position for a vehicle transmission comprising a base portion supporting an engaging portion, at least one shift gate to be engaged with and to be disengaged from the engaging portion, the at least one shift gate defining a vehicle shift stage, a movable member being movable to engage the at least one shift gate with the engaging portion and to disengage the at least one shift gate from the engaging portion, an actuator for moving the movable member in a direction for engaging the at least one shift gate with the engaging portion and for disengaging the at least one shift gate from the engaging portion, and the at least one shift gate including a stabilizing range for stabilizing an engagement between the engaging portion and the at least one shift gate, the method of determining a shift gate position for a vehicle transmission comprising:
 determining a shift gate reference position;
 controlling driving force outputted from the actuator;
 judging whether the engaging portion is within the stabilizing range of the at least one shift gate;
 controlling the driving force to be outputted from the actuator when the engaging portion is within the stabilizing range of the at least one shift gate;
 judging whether the movable member has moved;
 temporarily determining a position of the movable member as a position at the at least one shift gate when the movable member has not moved;
 judging whether a distance between the shift gate reference position and the position at the at least one shift gate is within a predetermined range; and
 determining the position of the movable member as the position at the at least one shift gate when the distance is within the predetermined range.

7. A method of determining a shift gate position for a vehicle transmission according to claim 6, further comprising:
 judging whether the engaging portion is positioned at a side of the shift gate reference position relative to the at least one shift gate when the engaging portion is not positioned in the stabilizing range of the at least one shift gate;
 judging whether the movable member has moved in order to guide the engaging portion towards the stabilizing range of the at least one shift gate when the engaging portion is positioned at the side of the shift gate reference position relative to the at least one shift gate; and
 outputting the sufficient driving force from the actuator in order to move the engaging portion in the stabilizing range when the movable member has not moved in order to guide the engaging portion towards the stabilizing range.

8. A method of determining a shift gate position for a vehicle transmission according to claim 7, further comprising:
 controlling the driving force outputted form the actuator when the movable member has moved in order to guide the engaging portion towards the stabilizing range.

9. A method of determining a shift gate position for a vehicle transmission comprising the at least one shift gate having at least a first shift stage and a second shift stage, the method of determining the shift gate position according to claim 8, further comprising:
 determining a temporary position at the second shift stage with reference to the position at the at least one shift stage, the position at the at least one shift stage being the position at the first shift stage;
 judging whether a current position of the movable member is within a range of the second shift stage;
 controlling the driving force outputted form the actuator when the current position of the movable member is within the range of the second shift stage;
 judging whether the movable member has been stationary; and
 determining the temporary position of the second shift stage as a position of the second shift stage.

10. A method of determining a shift gate position for a vehicle transmission according to claim 9, wherein the driving force outputted from the actuator is controlled to be zero.

11. A method of determining a shift gate position for a vehicle transmission according to claim 10, wherein the stabilizing range has a groove, and the engaging portion is engaged with and disengaged from the groove in response to the movement of the movable member.

12. A method of determining a shift gate position for a vehicle transmission according to claim 11, wherein the groove has a V-shaped cross section.

13. A method of determining a shift gate position for a vehicle transmission according to claim 12, wherein the shift gate reference position is determined by impacting the movable member with the base portion.

* * * * *